(12) United States Patent
Gonen (10) Patent No.: US 8,661,967 B2
(45) Date of Patent: Mar. 4, 2014

(54) COFFEE-MAKING MACHINE WITH SEMI-EXTERNAL HIGH VOLTAGE HALOGEN OR INFRA RED HEATING ELEMENT

(76) Inventor: Guy Hanan Gonen, Ra'anana (IL)

(*) Notice: Subject to any disclaimer, the term of this patent is extended or adjusted under 35 U.S.C. 154(b) by 379 days.

(21) Appl. No.: 13/041,459

(22) Filed: Mar. 7, 2011

(65) Prior Publication Data

US 2012/0231134 A1 Sep. 13, 2012

(51) Int. Cl.
*A47J 31/44* (2006.01)

(52) U.S. Cl.
USPC ............................ 99/281; 99/288; 99/283

(58) Field of Classification Search
USPC .......................................... 99/281, 288, 283
See application file for complete search history.

(56) References Cited

U.S. PATENT DOCUMENTS

| | | | |
|---|---|---|---|
| 2,839,988 A | 6/1958 | Tritt | |
| 4,137,833 A | 2/1979 | Yelloz | |
| 4,658,117 A | 4/1987 | Sayward, Jr. | |
| 5,046,409 A | 9/1991 | Henn | |
| 5,259,297 A | 11/1993 | Giuliano | |
| 5,371,830 A | 12/1994 | Wachenheim | |
| 5,498,757 A * | 3/1996 | Johnson et al. | 426/520 |
| 7,190,894 B2 * | 3/2007 | Chamberlain, Jr. | 392/490 |
| 2009/0095455 A1 | 4/2009 | Kyees | |

* cited by examiner

*Primary Examiner* — Anthony Weier
(74) *Attorney, Agent, or Firm* — Mark M. Friedman (57) ABSTRACT

An espresso making machine has a short wave heating element, selected from a halogen lamp and an infra red lamp, that is semi-external. The heating element is inside the water tank yet not exposed to water since it is encased in a heat conducting sleeve that crosses the water tank.

17 Claims, 7 Drawing Sheets

```
┌─────────────────────────┐
│     METHOD - 200        │
└─────────────────────────┘
```

PROVIDING THE ESPRESSO-MAKING MACHINE WITH A WATER TANK, THE WATER TANK HOLDING WATER AND HAVING A WATER OUTLET IN COMMUNICATION THROUGH A COMMUNICATION CHANNEL WITH A POD/CAPSULE OR ESPRESSO HANDLE, THE POD/CAPSULE OR ESPRESSO HANDLE CONTAINING GROUND COFFEE BEANS, THE COMMUNICATION CHANNEL GOVERNED BY A CONTROLLER

— 210

INSTALLING A METAL SLEEVE THAT CROSSES THE WATER TANK, THE METAL SLEEVE HAVING A SHORT WAVE HEATING ELEMENT ENCASED THEREIN, THE SHORT WAVE HEATING ELEMENT NOT IN CONTACT WITH THE WATER, THE SHORT WAVE HEATING ELEMENT SELECTED FROM A HALOGEN LAMP AND AN INFRA RED LAMP AND CAPABLE OF HEATING THE METAL SLEEVE SO AS TO HEAT THE WATER IN THE WATER TANK TO A NEAR BOILING TEMPERATURE

— 220

USING A CONTROLLER TO ACTUATE THE SHORT WAVE HEATING ELEMENT TO HEAT THE WATER TO NEAR BOILING AT A TEMPERATURE SUITABLE FOR MAKING ESPRESSO, THE TEMPERATURE OF THE WATER HEATED BY THE SHORT WAVE HEATING ELEMENT CALCULATED TO MAKE ESPRESSO WHEN THE HEATED WATER FLOWS FROM THE WATER TANK TO A POD/CAPSULE OR ESPRESSO HANDLE CONTAINING GROUND COFFEE BEANS AND EXTRACTS COFFEE

— 230

SUBJECTING GROUND COFFEE BEANS IN THE POD/CAPSULE OR ESPESSO HANDLE TO A FLOW OF HEATED WATER EXITING THE WATER TANK THROUGH THE WATER OUTLET AND TRAVELING THROUGH THE COMMUNICATION CHANNEL, THE HEATED WATER HAVING BEEN HEATED BY THE SHORT WAVE HEATING ELEMENT

| METHOD – 200 CONTINUED |
|---|

| MAINTAINING THE SHORT WAVE HEATING ELEMENT FREE OF LIME AND DEPOSITS OF MINERALS FROM THE WATER DURING THE LIFE OF THE ESPRESSO-MAKING MACHINE |
|---|

COFFEE-MAKING MACHINE WITH SEMI-EXTERNAL HIGH VOLTAGE HALOGEN OR INFRA RED HEATING ELEMENT

FIELD AND BACKGROUND OF THE INVENTION

The present invention relates to apparatuses and methods for coffee-making machines and, more particularly to coffee-making machines that have semi-external heating elements.

Coffee-making machines, a term which is understood to include within it espresso-making machines, require heating water used for making the coffee or espresso, and also for making other hot beverages (e.g., tea) and steam (to foam milk). The water used in coffee-making machines is water in which there are a significant amount of dissolved minerals. This may be tap water or it may be bottled water containing minerals.

It is well known that heating water causes at least some of the minerals to precipitate out of solution either through evaporation of the water solvent due to the heat or through precipitation of the solute out of solution as fine particles. In either case, the particles that come out of solution gravitate to the bottom or side of the container or get accrued on devices dipped in the water, holding the solution as sediment. For example, calcium deposits are a common outcome of heating water.

When rain falls to the ground it dissolves limestone and chalk. Soluble bicarbonate of calcium and magnesium are dissolved in the water. When the water is heated, the soluble bicarbonates release insoluble calcium carbonate, which causes lime-scale.

It is well known that calcification and the deposit of lime scale are a continuing problem for coffee-making machines for several reasons. The calcium and lime sticks to everything that touches water. This includes the heating element, the water quantity measuring element and other sensors and other critical components. The build-up of scale reduces thermal efficiency by increasing the time it takes to reach the desired temperature. More importantly, the lime or calcium deposits interfere with proper functioning of the heating element. Heat transfer is impaired and energy efficiency is reduced. When the heating element malfunctions from the build-up of the scaly deposits, the heating element tends to overheat and be in a state of short circuit. As a result of the short circuit, the entire coffee-making or espresso-making apparatus may cease to function and even other systems connected to the same electricity line may be adversely affected by the short circuit.

As a result, machines that are supposed to last 10 to 20 years end up lasting 2 to 4 years. Accordingly, equipment replacement costs are astronomical. Labor costs for maintaining these coffee making machines are also high since a certified espresso machine technician is required in order to replace these heating elements. Their work takes several hours and the machine is down during that time, affecting business.

One thing that can be done to try to prevent build-up of lime and calcium on the heating element is to increase the frequency of maintenance checks. Chemicals for cleaning the lime and calcium also cost money. Consequently, increasing the frequency of maintenance checks increases labor costs and generates a significant increase in overall maintenance costs.

Prior attempts to solve this problem include the use of water softeners that are placed into the water. Water softeners exchange calcium and magnesium ions with twice as many sodium ions. This exchange is expensive to maintain, requires a lot of sale to operate and can require a lot of extra water. Environmentalists also maintain that water softeners pollute our environment by depositing chloride into our water supply. They may also harm people on salt restricted diets. The environmental objections has led to legislation—at the state or local level—by one count in approximately 34 states of the United States restricting the use of water softeners in sanitary sewage systems. In some countries, moreover, water softeners may be banned in the near future for environmental reasons. Water softeners allegedly also speed up pipe damage as more salty water flows through the piping.

An additional prior art attempt to solve the problem involves the use of filters in the coffee-making machines. Filters are expensive. In addition, the filters must be maintained properly, however, in order to be effective. In fact, the filters need to be replaced every couple of months. Applicant's experience in servicing coffee making machines over decades is that filters are simply not maintained properly. They are not replaced when they should be. A common reason, besides laziness, is that there is a frequent labor changeover in the retail outlets that use coffee-making machines and there is a constant shortage of trained personnel able to change the filters.

Another prior art solution is a dry external heating element installed around the water tank as an integral part of the water tank. This solves the problem of scaly deposits building up. However, it causes other problems. For example, in case of malfunction, the entire water tank utilizing the dry external heating element needs to be replaced. These heating elements are also expensive since they require very high power to compensate for the fact that the heat they emit is emitted away from the water tank. In addition, a certified espresso-machine technician is needed to service the heating element. Labor costs for servicing these dry external heating elements can take several days since these heating elements are extremely difficult to maintain. The heating element must also be fully in contact with the metal tank surface or a gap will be filled by air pockets that decreases the life of the heating element. However, to be fully in contact with the metal tank surface often results in the envelope that the heating element is encased in being expanded out of shape during use, which complicates replacement by the technician.

Applicant has also heard of a company on the Internet calling itself "Scalebusters" that offers a computerized system installed on the incoming water line of a facility. The computer system uses an oscillating electronic field that claims to change the physical size, shape and charge of calcium molecules. Although alleged to be less expensive than water softeners, this computer system is expensive to install and maintain.

There is a compelling need to have a method and apparatus for solving the build-up of lime and calcium deposits from water that adversely affects coffee-making machines.

SUMMARY OF THE PRESENT INVENTION

One aspect of the present invention is an espresso-making machine having a short wave heating element that is inside a water tank, the water tank housing heated water that flows to a pod/capsule or espresso handle, the pod/capsule or espresso handle containing ground coffee beans, the short wave heating element encased in a heat conducting sleeve so as not to be in contact with water inside the water tank, the water containing minerals.

A further aspect of the present invention is directed to an assembly for a coffee-making machine including a semi-external heating element, comprising a first water tank for generating hot water for beverages a first heat conducting sleeve crossing the first water tank and enclosed so that an inner wall of the first heat conducting sleeve is not in contact with water from the first water tank; a first short wave heating element not in contact with water from the first water tank, the first short wave heating element encased in the first heat conducting sleeve, the first short wave heating element selected from the group comprising a halogen lamp and an infra red lamp, the short wave heating element connected to a controller that determines when and for how long the short wave heating element is actuated; a second water tank as an integral part of an espresso group head for generating hot water for coffee; a second heat conducting sleeve crossing the second water tank, a second inner wall of the second heat conducting sleeve not be in contact with water from the water tank; and a second short wave heating element not in contact with water, the second short wave heating element encased in the second heat conducting sleeve, the second short wave heating element selected from the group comprising a halogen lamp and an infra red lamp, the second short wave heating element connected to a controller that determines when and for how long the second short wave heating element is actuated, hot water heated by the second short wave heating element exiting the second water tank to a pod/capsule or espresso handle the pod/capsule or espresso handle containing ground coffee beans and the hot water heated by the second short wave heating element sufficiently to brew the ground coffee beans into espresso.

A still further aspect of the present invention involves a method of operating an espresso-making machine having a water tank, comprising providing an espresso-making machine with a short wave heating element that is inside the water tank but is not in contact with the water in the water tank; operating the espresso-making machine while the short wave heating element is disconnected from other electrical components of the espresso-making machine until the short wave heating element is burned out without causing a short circuit; and replacing the short wave heating element with a new short wave heating element.

A still further aspect of the present invention is directed to a method of operating an espresso-making machine, comprising providing the espresso-making machine with a water tank, the water tank holding water and having a water outlet in communication through a communication channel with a pod/capsule or espresso handle, the pod/capsule or espresso handle containing ground coffee beans, the communication channel governed by a controller; installing a heat conducting sleeve that crosses the water tank, the heat conducting sleeve having a short wave heating element encased therein, the short wave heating element not in contact with the water, the short wave heating element selected from a halogen lamp and an infra red lamp and capable of heating the heat conducting sleeve so as to heat the water in the water tank to a boiling temperature; using a controller to actuate the short wave heating element to heat the water to the boiling temperature, the temperature of the water heated by the short wave heating element calculated to be suitable for making espresso when the heated water flows from the water tank to the pod/capsule or espresso handle containing ground coffee beans, and extracts coffee; subjecting coffee granules in the pod/capsule or espresso handle to a flow of heated water exiting the water tank through the water outlet and traveling through the communication channel, the heated water having been heated by the short wave heating element; and maintaining the short wave heating element free of lime and deposits of minerals from the water during the life of the espresso-making machine.

These and other features, aspects and advantages of the present invention will become better understood with reference to the following drawings, descriptions and claims.

BRIEF DESCRIPTION OF THE DRAWINGS

Various embodiments are herein described, by way of example only, with reference to the accompanying drawings, wherein.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides an espresso-making machine that utilizes a semi-external heating element. An assembly, which may be constructed to fit existing espresso machines may include a short wave heating element selected from a halogen lamp and an infra red lamp encased in a heat conducting sleeve that may cross a water tank either entirely or less than entirely. The short wave heating element may be operationally engaged to a controller that may determine when the heating element is actuated. The water tank may have an outlet for heated water that may be in flow communication with a pod/capsule or espresso handle containing ground coffee beans so that actuation of the heating element may heat the heat conducting sleeve which may directly heat the water in the water tank. When heated water from the water tank is allowed to flow to the pod/capsule or espresso handle containing ground coffee beans, coffee may be extracted at a rate suitable for making espresso. The water tank may have an outlet for heated water that may be in flow communication with a hot water tap and an outlet for steam that may be in flow communication with a steam spout so that actuation of the heating element may heat the heat conducting sleeve which may directly heat the water in the water tank. When heated water from the water tank is allowed to flow to the hot water tap, hot beverage may be made; when steam from the water tank is allowed to flow to the steam spout, milk may be foamed at a rate suitable for making cappuccino. The heating element may be utilized and maintained free of lime or calcium deposits since the heating element may be kept dry at all times.

In contrast to prior art coffee-making machines in which the heating element is typically in contact with water and accumulates scale from lime or calcium during ordinary use, the coffee-making machine of the present invention and the assemblies used for such machines may utilize a heating element that may be kept dry by being encased in a heat conducting sleeve. Accordingly, no build-up of lime or calcium may occur on the heating element during use of the machine. In further contrast to the prior art, in which the conventional coffee-making machine uses a heating element that is constantly breaking down from lime deposits or other scale, the coffee making machine of the present invention may break down much less frequently. In further contrast to the prior art coffee-making machines in which the heating element needs constant maintenance, the coffee-making machine of the present invention including the assembly of the present invention, may not need nearly as much maintenance. Whenever the heating element needs to be replaced, the sleeve is removed or the heating element is removed from the sleeve and simply replaced. In further contrast to the prior art heating elements used for coffee-making machines, in which it takes a while for the water to be heated to a temperature suitable for making espresso, the present invention may utilize a short wave heating element that heats much more rapidly. In still further contrast to the prior art, in which the coffee-making machine heating element is not very efficient, the heating element of the coffee-making machine of the present invention may be about 50% more efficient. In still further contrast to coffee-making machines of the prior art, wherein when the heating element inside the machine accumulates lime impairing heat transfer and burns out this causes a short circuit shutting down the whole machine and possibly other appliances connected to the same electric line, the coffee-making machine of the present invention may utilize a short wave heating element that may be in a state of disconnection when the lamp gets burned. In this case, unlike the short circuit described for the prior art, other components of the coffee-making machine may remain unaffected. In contrast to the prior art coffee-making machines, which may last only two to four years, the coffee-making machine of the present invention or which utilizes an assembly of the present invention, may last ten to twenty years. In still further contrast to other prior art coffee-making machines that may utilize a fully external heating element, the short wave heating element of the present invention may be semi-external in that it may be external to the water in the water tank but it may be internal to the water tank of the espresso machine. The efficiency may be greater than that of external heating elements and they are not adversely affected by air pockets between the actual heating element and the surface of the water tank. In further contrast to prior art espresso-making machines, in which a certified espresso machine technician is needed to service or replace the heating element, the assembly or espresso-making machine of the present invention may not require a certified espresso machine technician to service or replace the short wave heating element used.

The principles and operation of an apparatus and a method for a coffee-making machine with semi-external high voltage heating element, according to the present invention may be better understood with reference to the drawings and the accompanying description.

Figure 1:
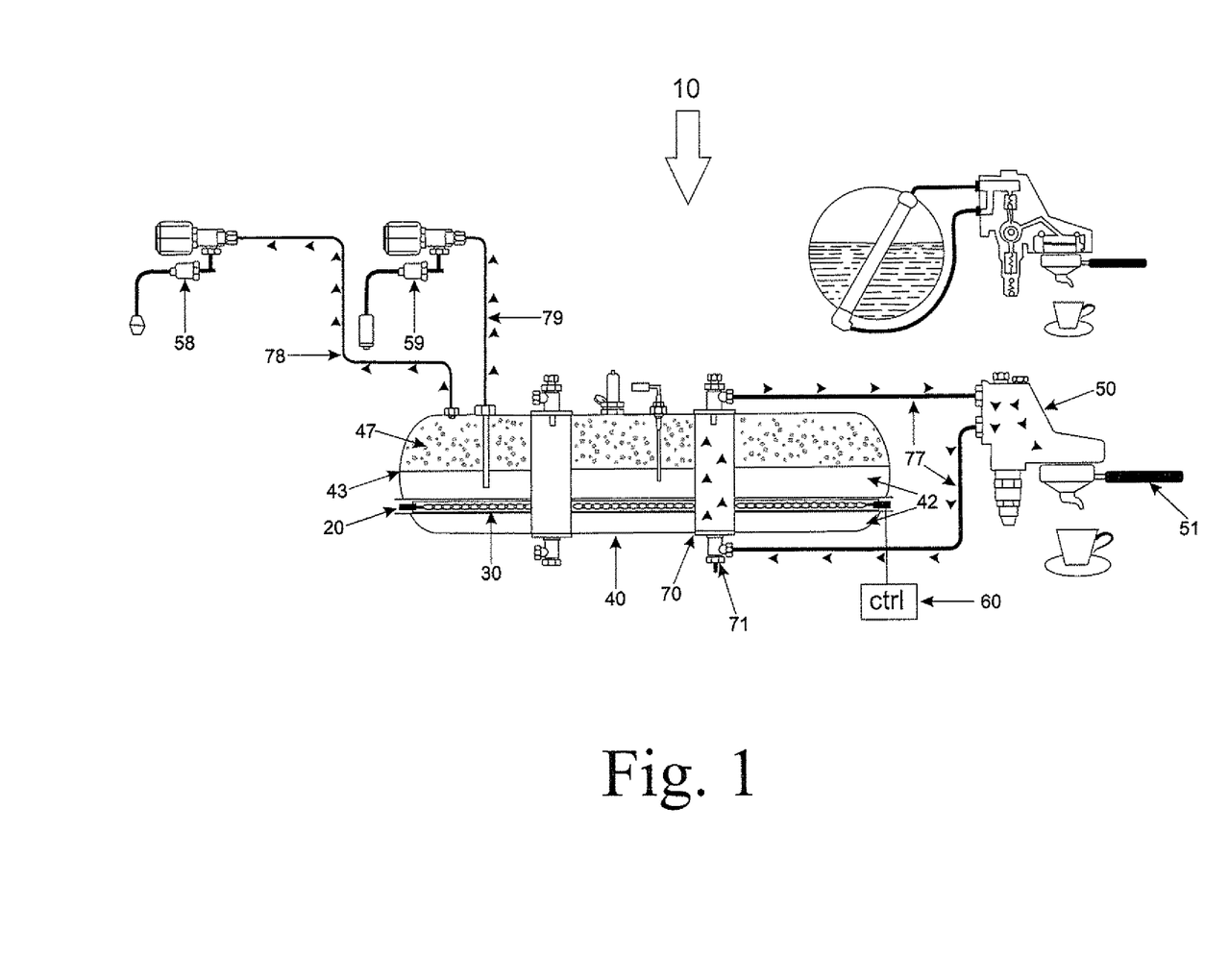
FIG. 1 is a front plan view of an espresso making machine, with a water tank containing a heating element and having a heat exchange pathway, in accordance with one embodiment of the present invention.

As seen from FIG. 1, an espresso-making machine 10 may have a short wave heating element 20 that may be inside a water tank 40 by being encased within a heat conducting sleeve 30 that crosses the water tank 40. The water tank may contain heated water (when the heating element is on or was on) that flows to an espresso group head 50 having a pod/capsule or espresso handle 51 containing ground coffee beans.

Heat conducting sleeve 30 shall be defined to mean a metal sleeve and shall be defined to also mean a non-metal sleeve that has a high thermal conductivity. A high thermal conductivity means (in units of Btu/(hr ° F. ft)) at least 15, or at least 40 or more preferred embodiments at least 100 or at least 200. This would also include, for example, a sleeve made of graphene, a recently discovered strong carbon material having a very high thermal conductivity.

Heat conducting sleeve 30 may cross the water tank at a level below the level 43 of the water 42 in the water tank 40. The term "short wave heating element" 20 as used in this patent application shall be defined to mean either a halogen lamp or an infra red lamp. Applicant has chosen this phrase merely because the halogen or infra red lamp will often be in the short wave of the light spectrum. However, the term "short wave wave heating element" as used herein is not necessarily limited to a particular portion of the light spectrum other as dictated by being a halogen lamp or an infra red lamp Short wave heating element 20 (in any embodiment of the present invention) may be a high voltage heating element, which means it may have a voltage of 110 or higher. Short wave heating element 20 may be encased in heat conducting sleeve 30 so as not to be in contact with water 42 inside the water tank 40. This water in the water tank may contain minerals that may precipitate or evaporate out of solution upon the water being heated. In this version, a heat exchanger 70 may traverse the water tank 40 in a substantially vertical direction.

FIG. 1 also shows a controller 60 that may be operationally engaged to the short wave heating element 20. Controller 60 may determine the timing of the actuation of the short wave heating element 20. The controller 60, or another controller, may also control flow channels of heated water from the water tank to selected outlets, for example flow channels from the water tank 40: flow channel 77 (connected to heat exchanger 70 that has inlet 71) of heated water crossing the water tank 40 to the pod/capsule or espresso handle containing ground coffee beans 51; flow channel 79 of heated water from the water tank 40 to the hot water tap 59; flow channel 78 of steam 47 from the water tank 40 to the steam spout 58.

Figure 2:
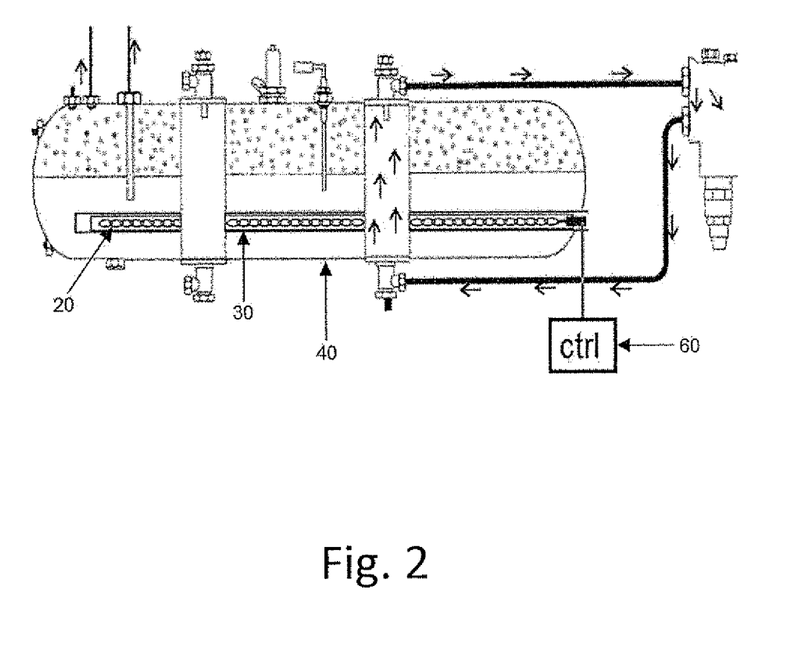
FIG. 2 is a front plan view of a water tank containing a heating element and having a heat exchange pathway wherein the heat conducting sleeve crosses the water tank but not so as to reach a second side of the water tank, in accordance with a further embodiment of the present invention.

FIG. 2 shows a version in which the heat conducting sleeve 30 does not cross the entire length of the water tank 40. Rather, the heat conducting sleeve 30 crosses enough of the water tank to ensure that the short wave heating element 20 encased in the heat conducting sleeve is capable of heating the water in water tank 40 rapidly. It is the intention of the present invention that the short wave heating element may heat the entire amount of water in water tank 40.

Figure 3:
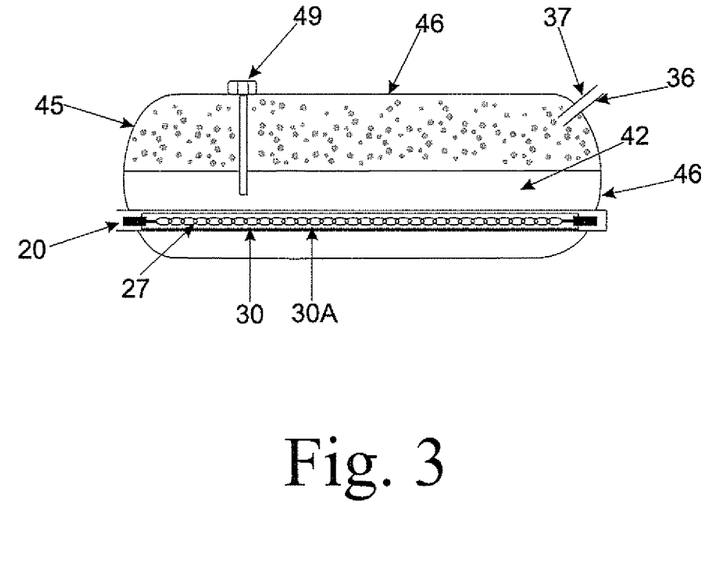
FIG. 3 is a front plan view of a water tank containing a heating element, in accordance with one embodiment of the present invention.

FIG. 3 shows a water tank 40 in accordance with one embodiment of the present invention having an elongated or tubular water inlet 49 and having an elongated water outlet 36 that may become flow channel 37 in communication with a pod/capsule or espresso handle containing ground coffee beans (not shown), a hot water tap (not shown) or a steam spout (not shown). Short wave heating element 20 may be positioned inward of the first side 45 of water tank 40 and inward of the second side 46 of water tank 40 so as to have the maximum effect on the heating of the water 42 in water tank 40. Accordingly, heat conducting sleeve 30 may traverse water tank 40 from a first side 45 of water tank 40 to a second side 46 of water tank 40.

Figure 4:
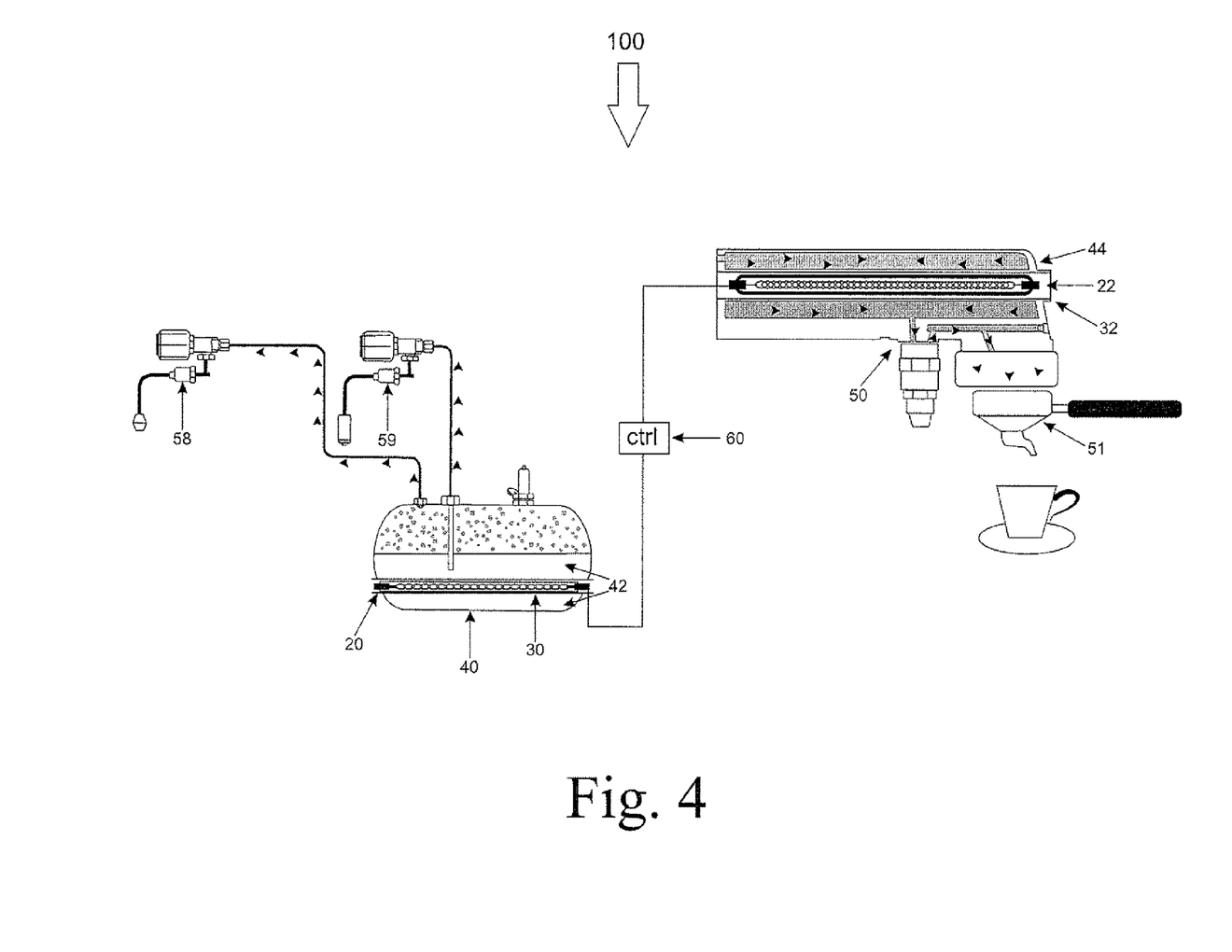
FIG. 4 is a front plan view of an assembly for use with an espresso-making machine including a system water tank having a heating element, and an espresso group head having a heating element, in accordance with one embodiment of the present invention.

FIG. 4 shows an assembly 100 that includes a system water tank 40 having heat conducting sleeve 30 with short wave heating element 20 and that also includes a smaller espresso tank 44 integrated into an espresso group head 50. The espresso-making machine includes a system water tank having a heating element, and an espresso group head having an integral heating element.

An assembly 100 for a coffee-making machine in accordance with the present invention may include a semi-external heating element. As seen in FIG. 4, the assembly 100 for a coffee-making machine, especially an espresso-making machine, may include a first water tank 40 for heating water that flows to the hot water tap 59 and for steaming water that flows to the steam spout 58; and a second water tank 44 for heating water that flows to the coffee pod/capsule or espresso handle 51 containing ground coffee beans to make espresso coffee.

The first short wave heating element 20 may be inside the first water tank but may be encased in first heat conducting sleeve 30 that may cross the first water tank and be enclosed so that an inner wall 30A of first heat conducting sleeve 30 may not be in contact with water 42 from the first water tank 40. Accordingly, the first short wave heating element 20 may not be in contact with water from the first water tank. The first short wave heating element may be selected from the group comprising a halogen lamp and an infra red lamp. Short wave heating element may be connected to a controller 60 that determines when and for how long the short wave heating element is actuated;

The assembly for the espresso-making machine may further include a second water tank 44 smaller than and not connected to the first water tank 40. A second short wave heating element 22 may be semi-external in that it may be inside the second water tank 44 yet may be not in contact with water in the second water tank, for example by being encased in a second heat conducting sleeve 32 that may cross the second water tank below the water level in the tank. The inner wall 32A of the second heat conducting sleeve 32 (sometimes called the second inner wall) may not be in contact with water from the water tank 44. As before, the second short wave heating element 22 may be kept dry and may be selected from the group comprising a halogen lamp and an infra red lamp.

FIG. 4 show how the second water tank may be connected to the controller. The second short wave heating element 22 may be connected to a controller 60 that may determine when and for how long the second short wave heating element is actuated. For example, the controller may determine that the heating element 22 may be actuated so as to cause water in the water to boil at a temperature sufficient that when it flows to the espresso head to contact the ground coffee beans it cools down to the temperature of water known in the art to be suitable for extracting coffee for making espresso, Hot water heated by the second short wave heating element 22 may exit the second water tank 44 and may flow to the pod/capsule or espresso handle containing ground coffee beans 51 after being heated by the second short wave heating element sufficiently to brew the ground coffee beans into espresso.

In any embodiment, the first and second heat conducting sleeves may entirely cross the water tank or instead may cross less than the entire water tank. For example, as shown in FIG. 2, heat conducting sleeve 30 may cross at least two-thirds of a length of the entire water tank. In assembly 100, first and second heat conducting sleeves may cross at least two-thirds of the length of the entire water tanks that the sleeves are in.

Typically, the first short wave heating element 20 may be adjacent the first heat conducting sleeve or in some cases may be separated by a cushion/pocket of air (as seen from FIG. 3).

However, unlike other heating elements, the air cushion 27 between the sleeve and the heating element 20 (or 22) will not cause a problem and will not impact how long it takes for the short wave heating element to heat the heat conducting sleeve. In assembly 100, the second short wave heating element 22 may be adjacent or separated by an air cushion/pocket from the second heat conducting sleeve and independently of this the first short wave heating element may be adjacent or may be separated by an air cushion/pocket from the first heat conducting sleeve.

In any embodiment, as seen from FIG. 2, a heat exchange pathway 70 may interrupt the water tank 40 in which a heat conducting sleeve 30 containing a short wave heating element 20 is encased. The heat exchange pathway 70 may run from the bottom of the water tank to the top of the water tank. A cooling fluid 77 may be placed through the heat exchange pathway 70. Any such heat exchange pathway 70 may not interrupt the heat conducting sleeve 30 itself containing the halogen lamp or infra red lamp.

Figure 5:
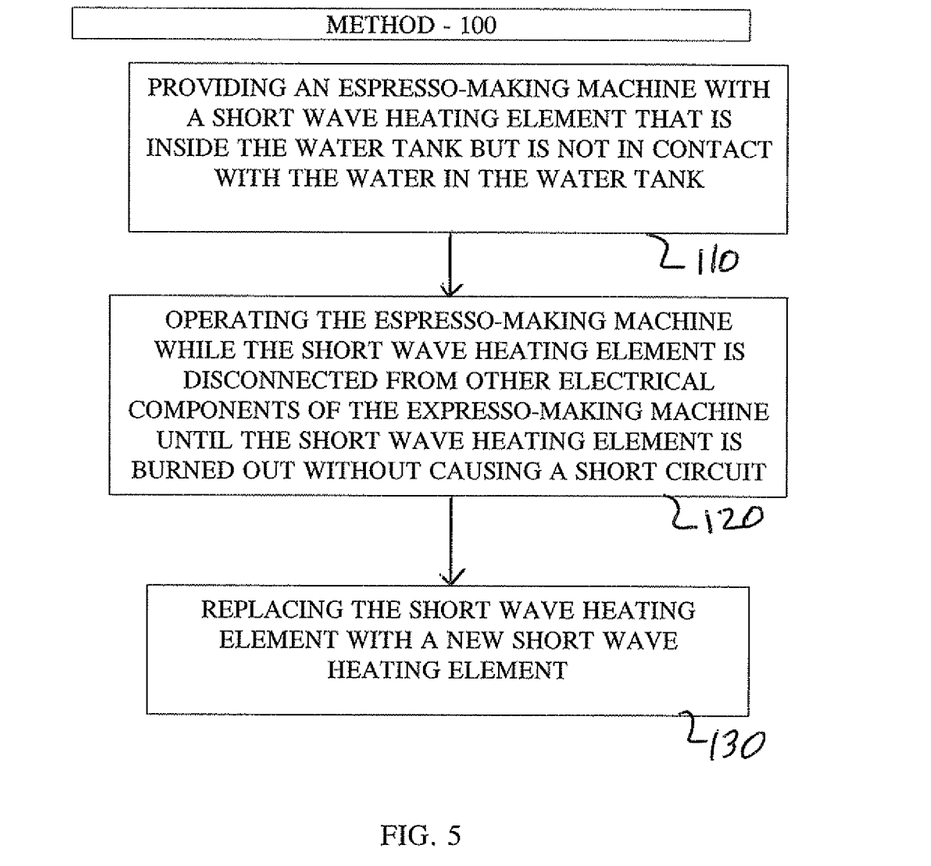
FIG. 5 is a flow chart showing a method in accordance with one embodiment of the present invention.

As seen from FIG. 5, the present invention may also be expressed as a method of operating an espresso-making machine having a water tank. Method 100 may include a step 110 of providing an espresso-making machine with a short wave heating element that is inside the water tank of the coffee-making machine but is not in contact with the water in the water tank. This may be seen from any one of FIGS. 1 through 5 where the short wave heating element is encased in a heat conducting sleeve that is under water inside the water tank.

A further step 120 of method 100 may include operating the espresso-making machine while the short wave heating element is disconnected from other electrical components of the expresso-making machine until the short wave heating element is burned out without causing a short circuit.

Figure 6A:
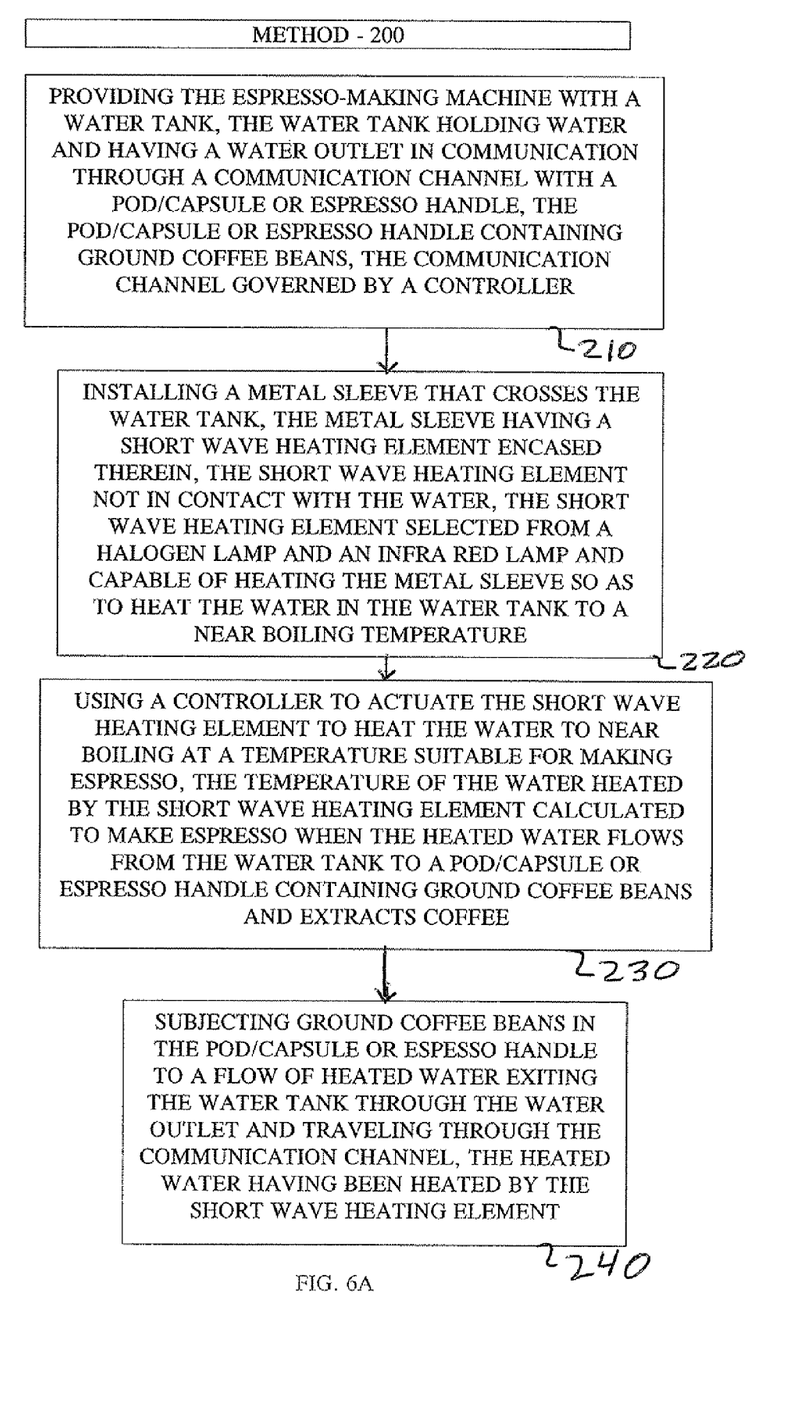
FIGS. 6A-6B is a flow chart showing a further method in accordance with one embodiment of the present invention.
Figure 6B:
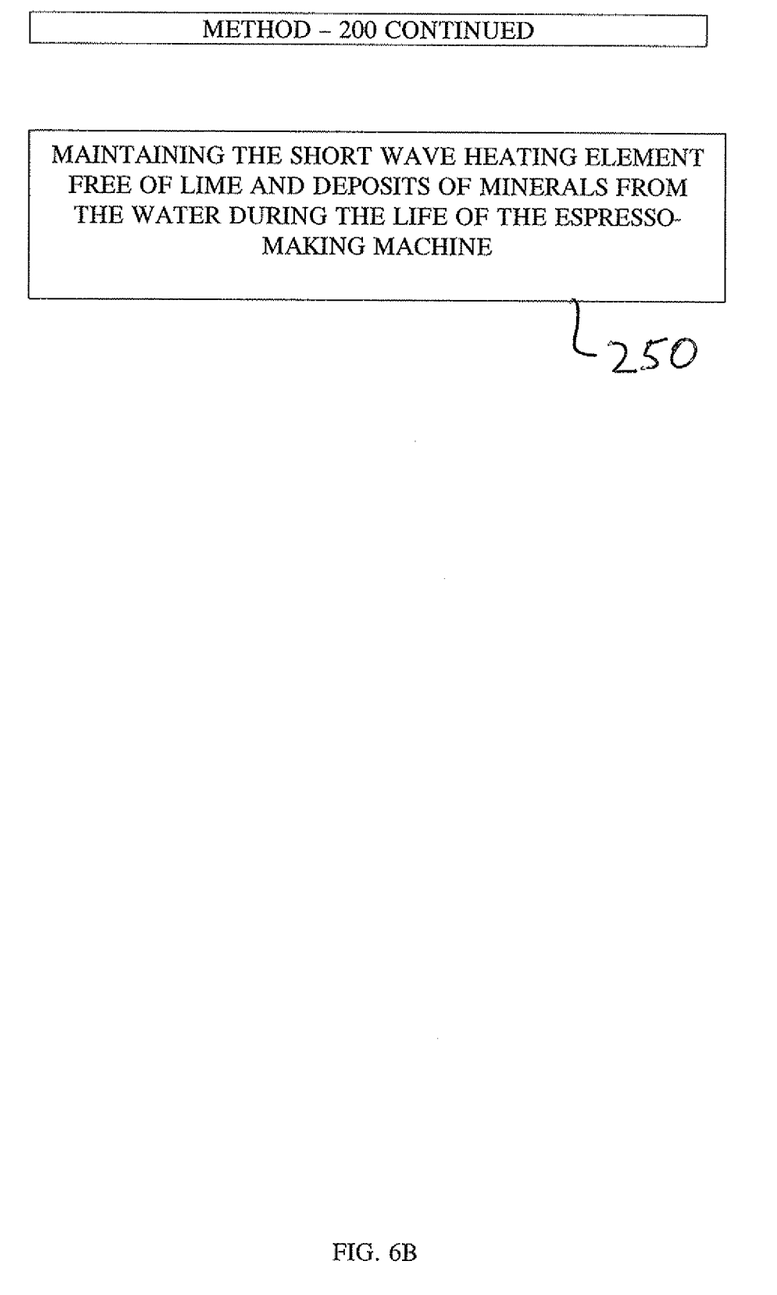

Method 100 may also comprise a step 130 of replacing the short wave heating element with a new short wave heating element. In some versions, the method may further comprise servicing the short wave heating element without requiring that the servicing be performed by a certified espresso machine technician As shown in FIG. 6A-6B, the present invention may be described as a further method of operating an espresso-making machine. Method 200 may include a step 210 of providing the espresso-making machine with a water tank, the water tank holding water and having a water outlet in communication with a pod/capsule or espresso handle containing ground coffee beans through a communication channel, the communication channel governed by a controller. Method 200 may have a step 220 of installing a heat conducting sleeve that crosses the water tank. Crossing the water tank may in some embodiments mean crossing it from side to side, i.e. the full length of the water tank as seen in FIG. 1. In other embodiments, crossing the water tank may involve crossing it through less than its full length, such as in FIG. 2. The heat conducting sleeve may have a short wave heating element encased therein. The encasing may be such as to have the short wave heating element adjacent the inner walls of the heat conducting sleeve. In other cases, the encasing may be such as to allow an air space between the outer surface of the short wave heating element and the inner walls of the heat conducting sleeve. In all embodiments, the short wave heating element is not in contact with the water and may be selected from a halogen lamp and an infra red lamp.

Short wave heating element 20 (or 22) may be capable of heating the heat conducting sleeve so as to heat the water in the water tank to a boiling temperature. In fact, halogen lamps heat very rapidly and the water in the water tank may be brought to boiling and higher quite rapidly. In some cases, this may occur in a matter of seconds.

Method 200 may include a step 230 of using a controller to control when to actuate the short wave heating element to heat the water. The water may be heated to a boiling temperature calculated such that when the heated water flows through to the espresso head and is in contact with the ground coffee beans therein, the heated water has cooled down to the temperature known in the art as being suitable for making espresso, which may be about 85 to 92 degrees Celsius The term "near boiling temperature" refers to the temperature of the heated water as it makes contact with the pod/capsule or espresso handle holding the ground coffee beans. In some embodiments, this temperature may be 92 degrees Celsius. Accordingly, the temperature of the water heated by the short wave heating element may be higher than near boiling temperature and may be boiling or higher. Such temperature may be calculated to make espresso when the heated water flows from the water tank flows to the pod/capsule or espresso handle containing ground coffee beans and extracts coffee.

Method 200 may include a step 240 of subjecting ground coffee beans in the pod/capsule or espresso handle containing ground coffee beans to a flow of heated water, which may be near boiling water, from the boiling water exiting the water tank through the water outlet and traveling through the communication channel, the heated water (which may be near boiling) having been heated by the short wave heating element. A further step of method 200 may include that the short wave heating element may be maintained free of lime and deposits of minerals from the water during the life of the espresso-making machine. This may be accomplished by operating the espresso machine over its entire life while the heating element is encased in the heat conducting sleeve so that it is protected from lime and mineral deposits. This may also be accomplished by performance maintenance on the heating element and/or replacing it without having to subject the heating element to contact with water from the water tank.

In some versions of the method the method further comprises removing the short wave heating element when necessary for maintenance and replacement of the short wave heating element without wetting the short wave heating element.

The term "powder" and the term "granules" contained in a pod/capsule or handle used for making espresso or coffee are broad terms that include any substance from which is extracted coffee used for making espresso or for making another kind of coffee. The phrase "pod/capsule or espresso handle" includes a pod, a capsule and includes an espresso handle.

"Water containing minerals" means ordinary tap water or water that is sold in bottles and that may contain minerals such as mineral water. It does not include water sold in bottles and specifically sold as "filtered water" where the minerals have been removed. Water containing minerals is suitable for use in making coffee or espresso.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. An espresso-making machine having a short wave heating element that is inside a water tank, the water tank housing and heating stationary water, the heated water flowing to a pod/capsule or espresso handle when the heated water flows out of the water tank, the pod/capsule or espresso handle containing ground coffee beans, the short wave heating element encased in a heat conducting sleeve such that the short wave heating element is kept dry and not in contact with water inside the sleeve or water inside the water tank, the water containing minerals.

2. The espresso-making machine of claim 1, wherein the heat conducting sleeve crosses the water tank at a level below a level of the water in the water tank.

3. The espresso-making machine of claim 1, wherein the short wave heating element comprises at least one of (i) a halogen lamp and (ii) an infra red lamp.

4. The espresso-making machine of claim 1, wherein the short wave heating element is a halogen lamp.

5. The espresso-making machine of claim 1, wherein the short wave heating element is an infra red lamp.

6. The espresso-making machine of claim 1, further including a controller operationally engaged to the short wave heating element and determining a timing of actuation of the short wave heating element.

7. The espresso-making machine of claim 6, wherein the controller controls a flow channel of heated water from the water tank to a selected outlet.

8. The espresso-making machine of claim 1, further including a heat exchanger.

9. The espresso-making machine of claim 1, wherein the short wave heating element is inward of a first side of the water tank and is inward of a second side of the water tank.

10. The espresso-making machine of claim 1, wherein the heat conducting sleeve traverses the water tank from a first side of the water tank to a second side of the water tank.

11. The espresso-making machine of claim 1, wherein the water tank has a tubular water inlet.

12. An assembly for a coffee-making machine including a semi-external heating element, comprising:
   a first water tank for generating steam and hot water for beverages by heating stationary water stored in the first water tank;
   a first heat conducting sleeve crossing the first water tank and enclosed so that an inner wall of the first heat conducting sleeve is not in contact with water from the first water tank;
   a first short wave heating element not in contact with water from the first water tank, the first short wave heating element encased in the first heat conducting sleeve kept dry and not in contact with any water inside the first heat conducting sleeve, the first short wave heating element comprising at least one of (i) a halogen lamp and (ii) an infra red lamp, the short wave heating element connected to a controller that determines when and for how long the short wave heating element is actuated;
   a second water tank, as an integral part of an espresso group head, for generating hot water for coffee;
   a second heat conducting sleeve crossing the second water tank, a second inner wall of the second heat conducting sleeve not be in contact with water from the water tank; and
   a second short wave heating element not in contact with water from the first or second water tank, the second short wave heating element encased in the second heat conducting sleeve without being in contact with any water inside the second heat conducting sleeve, the second short wave heating element comprising at least one of (i) a halogen lamp and (ii) an infra red lamp, the second short wave heating element connected to a controller that determines when and for how long the second short wave heating element is actuated,
   hot water heated by the second short wave heating element exiting the second water tank to a pod/capsule or espresso handle, the pod/capsule or espresso handle containing ground coffee beans, and the hot water heated by the second short wave heating element sufficiently to brew the ground coffee into espresso.

13. The assembly of claim 12, wherein the first water tank and the second water tank are not connected one to the other and wherein the first water tank is larger than the second water tank.

14. The assembly of claim 12, wherein the first heat conducting sleeve crosses at least two-thirds of a length of the entire first water tank and wherein the second heat conducting sleeve crosses at least two-thirds of a length of the entire second water tank.

15. The assembly of claim 12, wherein either (i) the first short wave heating element is adjacent the first heat conducting sleeve or (ii) the second short wave heating element is adjacent the second heat conducting sleeve or (iii) both the first short wave heating element is adjacent the first heat conducting sleeve and the second short wave heating element is adjacent the second heat conducting sleeve.

16. The assembly of claim 12, further comprising a heat exchange pathway interrupting the second water tank from the bottom of the second water tank to the top of the second water tank, a cooling fluid placed through the heat exchange pathway, the heat exchange pathway not interrupting the second heat conducting sleeve.

17. The assembly of claim 16, further comprising a first heat exchange pathway interrupting the first water tank from the bottom of the first water tank to the top of the first water tank, a cooling fluid placed through the first heat exchange pathway, the first heat exchange pathway not interrupting the first heat conducting sleeve.

* * * * *